United States Patent

[11] 3,607,401

| [72] | Inventors | Gerald Halpert<br>Annandale, Va.;<br>Joseph G. Haynos, Rockville; Joseph M. Sherfey, Lanham, Md. |
|---|---|---|
| [21] | Appl. No. | 729,299 |
| [22] | Filed | May 15, 1968 |
| [45] | Patented | Sept. 21, 1971 |
| [73] | Assignee | The United States of America as represented by the Administrator of the National Aeronautics and Space Administration |

[54] FRANGIBLE ELECTROCHEMICAL CELL
20 Claims, 4 Drawing Figs.

[52] U.S. Cl. ................................................. 136/6, 136/133, 136/135
[51] Int. Cl. ...................................................... H01m 35/32
[50] Field of Search ......................................... 136/6, 83, 100, 134, 135, 132, 133, 168–170

[56] References Cited
UNITED STATES PATENTS

| 2,870,235 | 1/1959 | Soltis | 136/134 P |
| 3,023,259 | 2/1962 | Coler et al. | 136/6 |
| 3,141,795 | 7/1964 | Eisler | 136/6 |
| 3,201,279 | 8/1965 | Root | 136/6 |
| 3,333,986 | 8/1967 | Chreitzberg et al. | 136/6 |
| 3,353,999 | 11/1967 | Osborn | 136/83 |
| 3,355,328 | 11/1967 | Meyers et al. | 136/100 |
| 3,375,136 | 3/1968 | Biggar | 136/6 |

Primary Examiner—Winston A. Douglas
Assistant Examiner—C. F. Lefevour
Attorneys—R. F. Kempf, E. Levy and G. T. McCoy ABSTRACT: A flexible, frangible electrochemical cell and a package therefor, suitable generally for application in an atmospheric environment, is fabricated with flexible, frangible electrode plates and electrolyte containing separators sandwiched between the plates. The electrodes and the separators are secured together by electrically nonconductive fasteners, and each electrode has an expanded metal terminal. The cell housing is a flexible polymeric member having bonded outer seams, some of which are formed directly over the expanded metal terminals which partially protrude from the housing. An additional envelope or outer container may be provided to thermally insulate the cell. Such a container may be made from foamed polymeric material or flexible polymeric sheet filled with insulation.

PATENTED SEP 21 1971

INVENTORS,
JOSEPH M. SHERFEY
GERALD HALPERT
JOSEPH G. HAYNOS

BY
*[signatures]*
ATTORNEYS

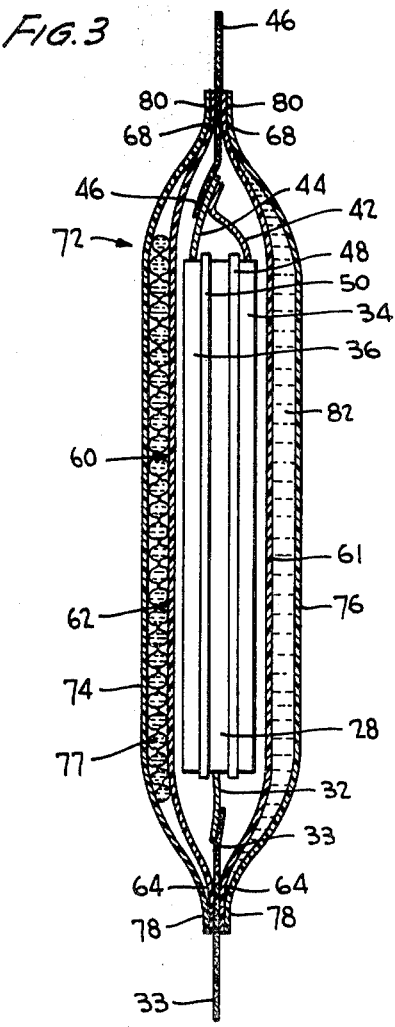
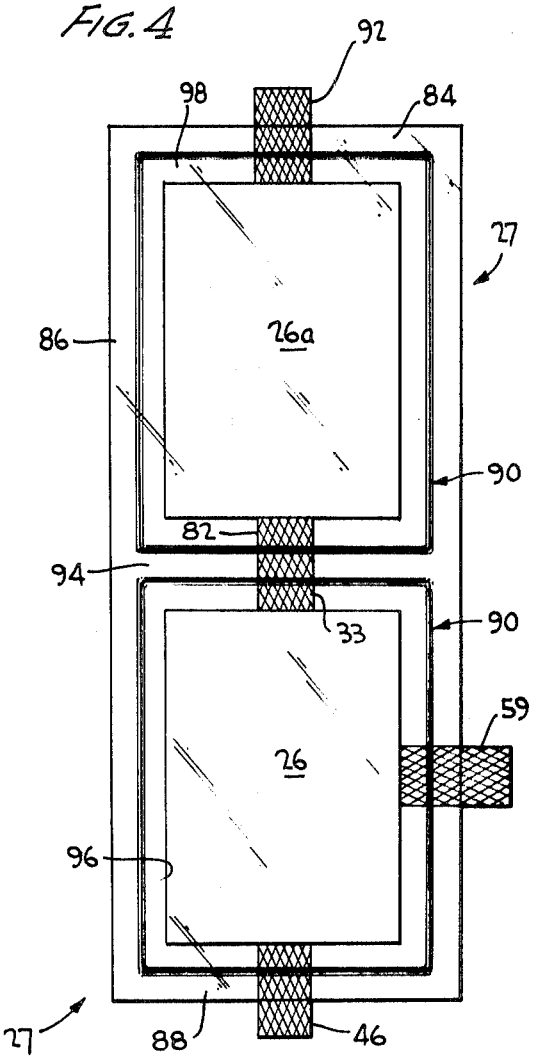

FRANGIBLE ELECTROCHEMICAL CELL

The invention described was made by employees of the U.S. Government and may be manufactured and used by or for the Government for governmental purposes without the payment of any royalties thereon or therefor.

The invention relates to an electrochemical cell and a package therefor, and, more specifically, to a flexible, frangible electrochemical cell having a heat-sealed outer housing and operable, generally, in a low-temperature atmospheric environment. While, heretofore, electrochemical cells were neither flexible nor frangible, the present invention concerns cells which are both flexible and frangible and therefore essentially nonhazardous when used in an atmospheric environment where there is a possibility of a collision between aircraft and a vehicle containing such cells.

The cell of the invention has electrode plates, for example, formed by sintering a metalic powder, such as nickel powder, to the surfaces of a flexible metallic grid which acts as a mechanical support for such sintered powder and as a current collector. The active material of the plates is contained by the pores of the sintered metallic powder. Between The plates are separators which are wetted with an electrolyte and which may include an additive to improve low temperature operation of the cell. The electrode plates and electrolyte wetted separators are secured together by nonconductive fasteners for compactness and maximum surface conductivity. To each electrode plate is spot welded or otherwise attached, a metal tab, for example, a nickel metal tab; and to this tab there is spot welded or otherwise attached a length of expanded metal which acts as an electrical terminal for the plate.

The cell housing is a sealed flexible polymeric material having bonded outer seams, with sections thereof formed directly over the expanded metal terminals which protrude from the housing. An outer insulation container may additionally be provided for the cell. Such container could be fabricated, for example, from a polymeric material upon which could be mounted a plurality of solar cells for charging purposes.

A number of cells can be connected as a battery pack, and the container for the pack may be fabricated from a polymeric envelope containing a thermally ballasting material. With this latter configuration, the solar cells would be mounted on the battery pack container rather than on the container of each cell.

Accordingly, an object of the invention is to provide an electrochemical cell which is both flexible and frangible.

Another object of the invention is to provide a flexible and frangible electrochemical cell housing bondable to and through flexible electrical terminals protruding from the cell.

A further object of the invention is to provide a flexible and frangible electrochemical cell having a minimum electrode spacing and a high resultant conductivity and in which the component parts thereof are both flexible and frangible.

Still another object of the invention is to provide a cell having a high negative-to-positive electrode surface area to provide a high gas recombination rate upon overcharging of the cell.

A further object of the invention is to provide, for an electrochemical cell, a heat sealed outer envelope serving to minimize temperature fluctuations of the cell.

Yet another object of the invention is to provide a plurality of electrochemical cells simultaneously encased within individual compartments of a flexible housing.

Another object of the invention is to provide a flexible and frangible electrochemical battery pack.

Other objects and many attendant advantages of the present invention will become obvious upon a more detailed description thereof taken in conjunction with the drawings, wherein:

FIG. 3 is an enlarged detailed section of a second embodiment of the electrochemical cell of FIG. 2; and FIG. 4 illustrates a plurality of electrochemical cells, such as that shown in FIG. 2, in series relationship and individually sealed within a compartmented bonded housing.

Figure 1:
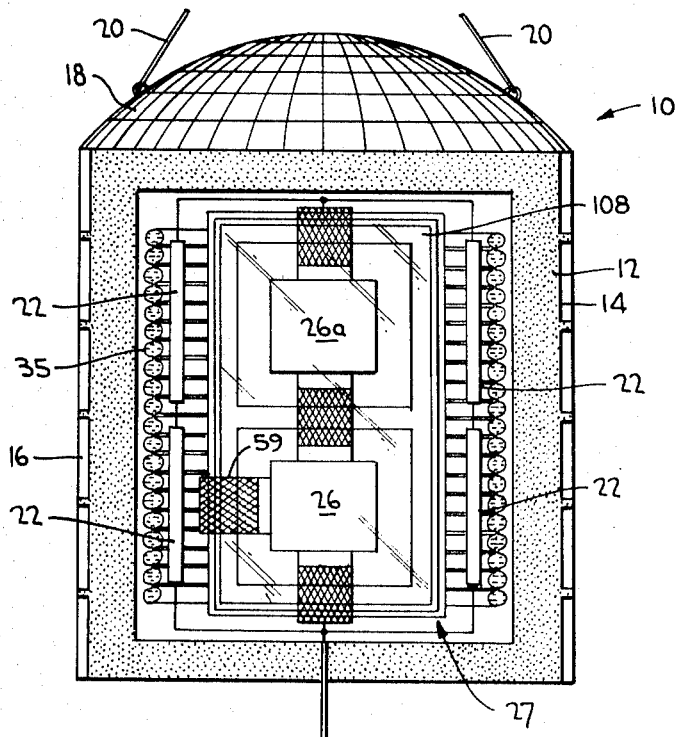
FIG. 1 is an elevation view, partly in section, of an experimental package having a foamed polymeric container with solar cells mounted thereon and a plurality of electrochemical cells therein.

With reference to FIG. 1, a scientific payload or experimental package for use in an atmospheric environment is shown generally at 10. It comprises a container 12 having an outer sidewall 14, upon which are mounted a plurality of solar cell panels 16, and a generally hemispherical top surface, upon which are mounted additional solar cell panels 18. A pair of guy wires 20, secured to the top surface of the experimental package 10, connects it to an air vehicle, such as a balloon (not shown). A plurality of electronic instrument boards 22, disposed within the container 12, are electrically connected to an antenna 24 (located externally to the container) and to a plurality of electrochemical cells 26 and 26a.

This plurality of cells is connected in a series relationship to form a battery pack 27. For ease of explanation, only two of such electrochemical cells are shown, and they are drawn in a scale larger than that used for the other components of the instrument package. It might be noted here that cells of the type used in the experimental package, and as will be described in detail hereinafter, have been constructed with a thickness of approximately 0.1 inch.

Container 12 is fabricated from a foamed polymeric material, such as polystyrene, polyurethane, or polyethylene, and completely surrounds the electronic instrument boards 22 and the associated electrochemical cells 26 and 26a to provide a thermally insulated receptacle therefor. Further thermal protection can be provided by a polymeric structure 35 formed as a plurality of tubular pockets, each containing a thermally ballasting substance such as water. The polymeric structure 35 essentially surrounds the electronic instrument boards 22 and is housed within container 12. This configuration is particularly advantageous in an environment characterized by wide temperature fluctuations in that the thermal ballasting afforded by the heat of crystallization of water (the heat evolved when water changes to ice) would tend to keep the temperature of the interior of the experimental package from going below 0° centigrade.

Container 12, pocketed polymeric units 35, and the various components housed within container 12, are fabricated from frangible materials so as to minimize damage in the event of an accidental collision between the experimental package and an aircraft.

The electrochemical cells 26 and 26a, which provide power for the components of the electronic boards 22, are recharged by operation of the solar cell panels 16 and 18. Accordingly, the instrument package 10 is capable of operation over extended periods of time without maintenance. crushable With particular reference to the exploded view of FIG. 2, electrochemical cell 26, for example, a nickel-cadmium type, includes a positive electrode comprised generally of a rectangular plate 28 formed of a sintered nickel metal plaque impregnated with nickel oxide active substance. The nickel plaque is fabricated by sintering a layer of nickel powder to both sides of a rectangular mesh-type metal grid 30 which acts as a flexible mechanical support and current collector. Grid 30 can be, for example, a perforated sheet, expanded metal, wire mesh, or an electroformed screen. The positive electrode 28 is also provided at one end with a sheet nickel tab 32 (secured thereto by a welding technique), to which is attached (by a conventional technique such as spot welding) an electrical terminal 33 in the form of a length of a flexible expanded metal.

A negative electrode is formed generally of a pair of rectangular plates 34 and 36. These plates are disposed physically in a parallel relationship to positive electrode plate 28, on either side thereof, and are both fabricated from a nickel plaque impregnated with cadmium-active substance. Fabrication of the plates of the negative electrode is accomplished according to techniques similar to those employed in the construction of the positive electrode plate 28. Accordingly, the impregnated cadmium plates 34 and 36 include flexible grids in the form of flexible rectangular metal mesh 38 and 40, respectively. The plates 34 and 36 are provided with nickel tabs 42 and 44, respectively, which are joined to a length of expanded metal 46, providing a terminal for the negative electrode. Although expanded metal is provided on each tab as shown in the Figure, it should be understood, as an alternate, that tabs could be connected together with a common terminal as shown in FIG. 3.

A plurality of flexible separators 48 and 50 (of nylon cloth, for example) are respectively sandwiched between the positive electrode plate 28 and each of the adjacent negative electrode plates 34 and 36, and are wetted with a fluid electrolyte, for example, a 30 percent solution of potassium hydroxide in water. As shown in the Figure, the electrolyte may be contained alternatively by a crushable capsule 52 positioned between negative electrode plate 34 and polymeric housing 62. By the electrolyte being so contained, the cell is protected from deterioration during storage. At such time as the cell is to be put into use, it is activated by the capsule being crushed (for example, by pressing on the electrode stack), thereby releasing the electrolyte. In either embodiment, the electrolyte may be modified by the addition of either lithium hydroxide or sodium hydroxide to improve its operation in a low temperature environment such as the upper atmosphere.

To insure compactness and intimate electrical contact therebetween, the electrode plates 28, 34, and 36 and the electrolyte-wetted separators 48 and 50 may be secured together by nonconductive frangible fasteners, such as frangible nonconductive rivets or clips. Another preferred method, as illustrated in FIG. 2, includes the provision of a plurality of apertures 54 grouped at the center and four corners of the rectangular electrode plate stack and a length of nonconductive thread 55 passing through each group of the apertures 54 to sew or bind together the electrode plates and separators.

Figure 2:
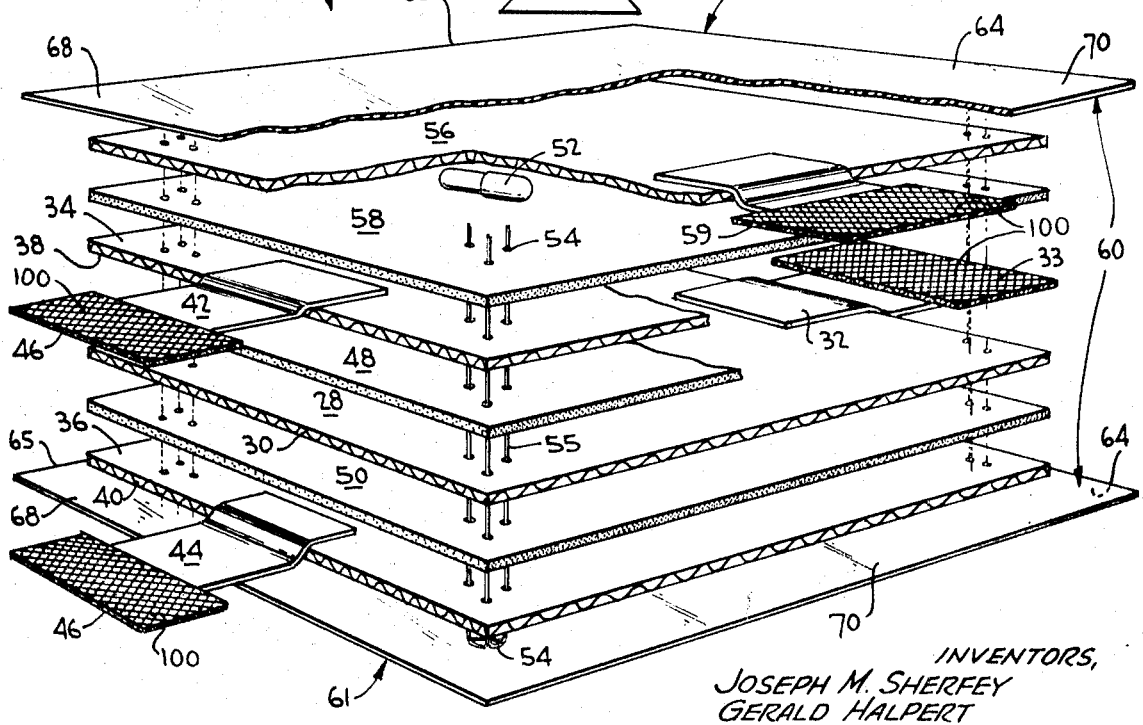
FIG. 2 is an enlarged exploded view in perspective illustrating the structural features of each individual electrochemical cell of FIG. 1.

Since the cell of FIG. 2 has the negative electrode formed of two plates 34 and 36 and the positive electrode formed of only one plate 28, there is provided a negative-to-positive electrode surface area ratio of 2:1, which ratio promotes a high recombination rate for the generated oxygen. On the other hand, although not necessary in the instant case, but if desired, an oxygen recombination electrode plate 56 and an associated separator 58 may be included in the electrode plate stack for the purpose of recombining the oxygen generated upon charging of the electrochemical cell 26, for example, by operation of the solar cell panels. The oxygen electrode plate 56 would then be provided with an expanded metal terminal 59 similar in construction to that of the terminal 46. It will be observed in FIG. 1 2:1, the electrochemical cell 26a is illustrated without a catalytic electrode whereas electrochemical cell 26 is illustrated with the catalytic electrode and its associated terminal.

With reference to FIGS. 2 and 3, a leaktight, thin wall housing 60 for the electrode plate stack (electrode plates and separators) is fabricated from two thin sheets 61 and 62 of a flexible polymeric material such as polyethylene, fluorinated ethylene propylene, polyethylene terephthalate, or other similar materials, or combinations thereof, which have a low oxygen and water vapor permeability characteristic. The electrode plate stack is placed on thin sheet 61 with the expanded metal terminals 33, 46 and 59 protruding therefrom. Sheet 62 is then placed over the electrode plate stack. These sheets 61 and 61 are next joined together at their adjacent margins (64 to 64 and 68 to 68, for example) by the application of heat and pressure or by an adhesive to form leaktight seams, thereby completely encasing the electrode plate stack.

Fabricated in this manner, thin wall housing 60 essentially has margins 64 fused together and bonded directly to and through the protruding expanded metal terminal 33, margins 68 fused together and bonded directly to and through the protruding expanded metal terminal 46, and margins 65 fused directly together. Margins 70 are fused together and bonded directly to and through the protruding expanding metal terminal 59, should the catalytic electrode 56 be present; otherwise margins 70 would be fused directly together. Accordingly a leaktight seal is effected by the polymeric material being bonded to and through the perforations of the expanded metal terminals so that sheets 61 and 62 are joined both to the expanded metal terminals and to each other. If desired, the expanded metal terminals 33, 46 and 59 may be provided with thin coating of polymeric material as indicated by reference numeral 100 in FIG. 2, in order to enhance the bonding of the polymeric sheets thereto.

The advantage to be gained by making bonds "to and through" the expanded metal terminals is important for the reason that there must be established a leaktight seal between the polymeric housing and the terminals protruding therefrom. Generally, with the terminals being fabricated from unperforated sheets metal, a seal of this type could not be achieved for it would be weak where the polymeric material is bonded to the unperforated sheet because the seal would depend on the "peel strength" of the metal-to-polymer bond. Since the best adhesives have "peel strengths" that are relatively low, the resulting seal would probably fail. Accordingly, in the preferred embodiment of the invention there has been devised the novel approach of fusing the two polymeric sheets into one integral homogenous mass at all those places where there is a hole in the perforated or expanded metal. Thus, at these places, there is no adhesive bond to fail due to lack of "peel strength" and the integrity of the seal is greatly enhanced. At all other places where the polymeric material passes over the terminal, there is a metal-to-polymer bond which does depend on "peel strength." However, since these latter places are relatively small and supported by the adjacent places where there are homogenous polymer-to-polymer fusion bonds through the holes in the expanded metal, there is developed an effective seal that will not fail.

FIG. 3 illustrates, in cross section, generally the electrochemical cell as shown in FIG. 2 with some slight modifications as will be described. More particularly, the electrochemical cell is illustrated without the catalytic electrode 56 and with he nickel tabs 42 and 44 of the negative electrode plates 34 and 36 joined to a common expanded metal terminal 46. The flexible thin sheets of polymeric material 61 and 62 are shown joined together along their adjacent margins 64 and 68 to provide a leaktight thin wall housing 60 for the electrodes, as described in connection with FIG. 2.

In addition, there is provided an outer envelope 72 fabricated from a first polymeric sheet 74 and a second polymeric sheet 76, both of which are fused at their outer peripheral margins 78 and 80, for example, to the margin seams 64 and 68, respectively, of the polymeric housing 60. A high heat capacity substance, such as water, could fill the space between the polymeric housing 60 and the outer envelope 72 to provide thermal ballast for the electrochemical cell within housing 60. For example, this space could be divided either horizontally or vertically into tubular, water-filled pockets 77. Such a design would tend to keep the temperature of the assembly from going below 0° centigrade, as explained above in connection with FIG. 1, and, in addition, would make it impossible for all of the water to collect at the bottom of the containing space. In many applications the outer envelope would not be required. Accordingly, its provision in conjunction with the above-described electrochemical cell is optional.

With regard to FIG. 4, a method of fabricating the battery pack 27, also illustrated in FIG. 1, will now be explained. Expanded metal terminal 33 of the positive electrode plate of the electrochemical cell 26 is secured by spot welding, or by any other suitable technique, to expanded metal terminal 46 of the negative electrode plates of the electrochemical cell 26a. '*Additional cells may be connected in a likewise fashion; however, for the purposes of illustration, only two are shown in the Figure. The electrode plate stacks so formed are then placed between a pair of thin, generally rectangular polymeric sheets which are then heat and pressure joined together along their adjacent outer peripheral margins 84, 86 and 88 to form a flexible thin wall receptacle open along one margin 90.*

The seams 88 and 84 are formed directly over the terminal 46 and 92 of electrochemical cells 26 and 26a, respectively, to provide leaktight seals in a manner similar to that described in connection with the embodiment shown in FIG. 2. The cells are then separated by an additional seam formed therebetween, such as the seam 94, thereby sealably separating each cell in a separate compartment of the polymeric envelope. Accordingly, the electrochemical cell 26 is retained in a compartment 96 with its terminals 33, 46 and 59 protruding therefrom, and the cell 26a is retained in a compartment 98 with the terminals 82 and 92 protruding therefrom. Each compartment is then provided with requisite electrolyte, after which the polymeric housing is sealed along its margins, indicated at 90, to seal each electrode stack and its electrolyte within a respective compartment.

Since the battery pack is fabricated from flexible electrochemical cells, it is flexible and therefore can be formed into a cylinder or other desired configuration without damage. In addition, because its constituent parts are frangible, it would itself be frangible should it be struck by an airplane or other air vehicle when carried by a balloon. Such a battery is therefore useful in experiments where it is desired to have a lightweight, frangible, battery pack as a source of power.

While the electrochemical cell has been described as a nickel-cadmium type, the invention is equally applicable to other types of electrochemical cells.

Although preferred embodiments of the invention have been shown and described, it is to be understood that the invention is not to be limited by the specific language incorporated in the above specification and the appended claims, wherein I claim:

1. A flexible and frangible battery comprising:
   at least two flexible, frangible electrochemical cells, each including a flexible, frangible positive electrode having at least one plate and a flexible, frangible negative electrode having at least two plates,
   flexible, frangible separators sandwiched between adjacent plates of said electrodes,
   a current-carrying electrolyte substance generally carried by each of said separators,
   each of said positive electrodes of each of said electrochemical cells being provided with a flexible, frangible expanded metal positive terminal having perforations therein,
   each of said negative electrodes of each of said electrochemical cells being provided with a flexible, frangible expanded metal negative terminal having perforations therein,
   the flexible expanded metal positive terminal of one of said electrochemical cells being joined to the flexible expanded metal negative terminal of another electrochemical cell whereby said electrochemical cells are joined in series relationship, and
   a flexible, frangible thin wall housing sealably retaining said joined electrochemical cells therein and, where contacting said expanded metal terminals, being bonded to and through the perforations thereof.
   said housing being provided with a leaktight seam bonded directly to and through the perforations of each of said joined flexible expanded metal terminals, whereby said joined electrochemical cells are sealably separated from each other.

2. The structure as recited in claim 1, and further including:
   a flexible, frangible outer container surrounding said flexible housing, and a high heat capacity substance in said outer container for thermally ballasting said joined electrochemical cells.

3. The structure as recited in claim 8 wherein each of said electrode plates includes:
   a flexible, frangible metal grid,
   a sintered metallic material covering said grid, and
   an active material carried within the pores of said sintered metallic material; and wherein said polymeric material is selected from the group consisting of polyethylene, fluorinated ethylene propylene, polyethylene terephthalate, or combinations thereof.

4. A flexible, frangible electrochemical cell comprising:
   a plurality of flexible, frangible electrodes, each of said electrodes being provided with a flexible, frangible expanded metal electrical terminal having perforations therein,
   a plurality of flexible, frangible separators sandwiched between and separating said electrodes,
   a current-carrying electrolyte substance and
   a flexible, frangible thin wall housing sealably retaining said electrodes separators and electrolyte therein,
   said expanded metal electrical terminals protruding from said housing,
   said housing being provided with a leaktight seam formed directly over and bonded to and through the perforations of each protruding expanded metal electrical terminal for effecting a leaktight seal.

5. The structure as recited in claim 4, and further including:
   means for securing together said electrodes and said separators.

6. The structure as recited in claim 5 and further including:
   a flexible, frangible outer container surrounding said flexible, thin wall housing, and
   a high heat capacity substance in said outer container for thermally ballasting said cell.

7. The structure as recited in claim 9 wherein each of said electrodes includes at least one plate element comprising:
   a flexible, frangible metal grid,
   a sintered metallic material covering said grid, and
   an active material carried within the pores of said sintered metallic material; wherein
   said polymeric material is selected from the group consisting of polyethylene, fluorinated ethylene propylene, polyethylene terephthalate, or combinations thereof; and wherein
   said electrolyte substance is carried by each of said separators.

8. The structure as recited in claim 1, wherein:
   said housing comprises a polymeric material,
   said expanded metal terminals are provided with a thin coating of polymeric material, and
   the union of said polymeric material of said housing with itself and with that coated on said expanded metal terminals is accomplished by means of heat and pressure to provide a leaktight seal for said housing.

9. The structure as recited in claim 4 wherein:
   said housing comprising a polymeric material,
   said expanded metal terminals are provided with a thin coating of polymeric material, and
   the union of said polymeric material of said housing with itself and with that coated on said expanded metal terminals is accomplished by means of heat and pressure to provide a leaktight seal for said housing.

10. The structure in claim 4, wherein said electrolyte is contained by a crushable capsule.

11. A flexible and frangible battery comprising:
   at least two flexible, frangible electrochemical cells, each including a flexible, frangible positive electrode having at least one plate and a flexible, frangible negative electrode having at least two plates,
   flexible, frangible separators sandwiched between adjacent plates of said electrodes,
   a current-carrying electrolyte substance generally carried by each of said separators,
   each of said positive electrodes of each of said electrochemical cells being provided with a flexible, a frangible expanded metal positive terminal having perforations therein, said expanded metal positive terminal being free of polymeric coating,
   each of said negative electrodes of each of said electrochemical cells being provided with a flexible, frangible expanded metal negative terminal having perforations therein, said expanded metal negative terminal being free of polymeric material, the flexible expanded metal positive terminal of one of said electrochemical cells being joined to the flexible expanded metal negative terminal of another electrochemical cell whereby said electrochemical cells are joined in series relationship, and a flexible, frangible thin wall housing sealably retaining said joined electrochemical cells therein and, where contacting said expanded metal terminals, being bonded to and through the perforations thereof, said housing being provided with a leaktight seam bonded directly to and through the perforations of each of said joined flexible expanded metal terminals, whereby said joined electrochemical cells are sealably separated from each other.

12. The structure as recited in claim 11, and further including:

a flexible, frangible outer container surrounding said flexible housing, and a high heat capacity substance in said outer container for thermally ballasting said joined electrochemical cells.

13. The structure as recited in claim 11, wherein:

said housing comprises a polymeric material, and the union of said polymeric material of said housing with itself and with said expanded metal terminals is accomplished by means of heat and pressure to provide a leaktight seal for said housing.

14. The structure as recited in claim 13, wherein each of said electrode plates includes:

a flexible, frangible metal grid, a sintered metallic material covering said grid, and an active material carried within the pores of said sintered metallic material; and wherein said polymeric material is selected from the group consisting of polyethylene, fluorinated ethylene propylene, polyethylene terephthalate, or combinations thereof.

15. A flexible, frangible electrochemical cell comprising:

a plurality of flexible, frangible electrodes, each of said electrodes being provided with a flexible, frangible expanded metal electrical terminal having perforations therein, said expanded metal electrical terminal being free of polymeric/coating, a plurality of flexible, frangible separators sandwiched between and separating said electrodes, a current-carrying electrolyte substance, and a flexible, frangible thin wall housing sealably retaining said electrodes, separators, and electrolyte therein, said expanded metal electrical terminals protruding from said housing, said housing being provided with a leaktight seam formed directly over and bonded to and through the perforations of each protruding expanded metal electrical terminal for effecting a leaktight seal.

16. The structure as recited in claim 15, and further including:

means for securing together said electrodes and said separators.

17. The structure as recited in claim 16 and further including:

a flexible, frangible outer container surrounding said flexible, thin wall housing, and a high heat capacity substance in said outer container for thermally ballasting said cell.

18. The structure as recited in claim 15 wherein:

said housing comprising a polymeric material, and the union of said polymeric material of said housing with itself and with said expanded metal terminals is accomplished by means of heat and pressure to provide a leaktight seal for said housing:

19. The structure as recited in claim 18 wherein each of said electrodes includes at least one plate element comprising:

a flexible, frangible metal grid, a sintered metallic material covering said grid, and an active material carried within the pores of said sintered metallic material; wherein said polymeric material is selected from the group consisting of polyethylene, fluorinated ethylene propylene, polyethylene terephthalate, or combinations thereof; and wherein said electrolyte substance is carried by each of said separators.

20. The structure in claim is, wherein said electrolyte is contained by a crushable capsule.